(12) United States Patent
Evers

(10) Patent No.: US 11,145,499 B2
(45) Date of Patent: Oct. 12, 2021

(54) MASS SPECTROMETRIC SAMPLE PREPARATION FOR MATRIX-ASSISTED IONIZATION

(71) Applicant: Bruker Daltonik GmbH, Bremen (DE)

(72) Inventor: Waltraud Evers, Delmenhorst (DE)

( * ) Notice: Subject to any disclaimer, the term of this patent is extended or adjusted under 35 U.S.C. 154(b) by 0 days.

(21) Appl. No.: 17/027,912

(22) Filed: Sep. 22, 2020

(65) Prior Publication Data

US 2021/0098242 A1 Apr. 1, 2021

(30) Foreign Application Priority Data

Sep. 27, 2019 (DE) .......................... 102019126201-1

(51) Int. Cl.
*H01J 49/04* (2006.01)
*H01J 49/00* (2006.01)

(52) U.S. Cl.
CPC ...... *H01J 49/0418* (2013.01); *H01J 49/0031* (2013.01); *H01J 49/0431* (2013.01)

(58) Field of Classification Search
CPC . H01J 49/0418; H01J 49/0031; H01J 49/0431
See application file for complete search history.

(56) References Cited

U.S. PATENT DOCUMENTS

| 7,318,590 | B2 | 1/2008 | Razavi |
| 9,275,188 | B2 | 3/2016 | Kostrzewa |
| 2013/0217010 | A1 | 8/2013 | Suchocki et al. |
| 2013/0309714 | A1 | 11/2013 | Hyman et al. |
| 2014/0260700 | A1 | 9/2014 | Thomas et al. |

FOREIGN PATENT DOCUMENTS

| CN | 106404474 A | 2/2017 |
| DE | 102010006450 A1 | 8/2011 |
| GB | 2493179 A | 1/2013 |

OTHER PUBLICATIONS

Trimpin, S., McEwen, C.N. Multisample preparation methods for the solvent-free MALDI-MS analysis of synthetic polymers. J Am Soc Mass Spectrom 18, 377-381 (2007).

*Primary Examiner* — Nicole M Ippolito
*Assistant Examiner* — Hanway Chang
(74) *Attorney, Agent, or Firm* — Benoit & Côté Inc.

(57) ABSTRACT

The invention relates to the preparation of samples for mass spectrometric analyses with matrix-assisted ionization (e.g. MALDI), particularly using the matrix material 2,5-dihydroxyacetophenone (DHAP), and comprises sample preparation in microvessels with the addition of beads or other solid bodies. In this way, particularly thorough mixing can be achieved by shaking ("vortexing") the microvessels, on the one hand, while crystallization of the matrix material can be initiated in the liquid, on the other hand. It is sufficient to have around 5 to 15 glass beads, 0.5 millimeters in diameter, which scrape against each other and against the vessel wall, and thus cause a DHAP solution to start becoming turbid after one to two minutes by forming tiny crystal nuclei. This allows simultaneous, fully automated preparation of, in particular, a large number of samples, including pipetting onto sample support plates by means of a pipetting and shaking robot.

13 Claims, 2 Drawing Sheets

MASS SPECTROMETRIC SAMPLE PREPARATION FOR MATRIX-ASSISTED IONIZATION

BACKGROUND OF THE INVENTION

Field of the Invention

The invention relates to the (parallel) preparation (of a large number) of samples with matrix substances, particularly the matrix substance 2,5-dihydroxyacetophenone (DHAP), for mass spectrometric analyses with matrix-assisted ionization (e.g. MALDI).

Description of the Related Art

The Prior Art is explained below with reference to a specific aspect. This shall not be understood as a limitation, however. Useful further developments and modifications of what is known from the Prior Art can also be applied above and beyond the comparatively narrow scope of this introduction, and will easily be evident to the expert skilled in the art in this field after reading the following disclosure.

2,5-dihydroxyacetophenone (DHAP) is an ideal matrix material for the analysis of intact proteins in the mass range from 8 to 100 kilodaltons (a dalton corresponds to an atomic mass unit u). It provides outstandingly high sensitivity for heavy proteins, such as digest proteins of antibodies, thus making it possible to use very small sample volumes. A further advantage is that practically no spontaneous fragmentation (in-source decomposition, ISD) occurs, less than for all other known matrix materials. Furthermore, a particularly high mass resolution is achieved. In addition, ionization with DHAP generates more doubly charged ions than is usual with MALDI; it is often advantageous to analyze the multiply charged ions because they are to be found in a lower mass range (8-20 kilodaltons), in which a MALDI time-of-flight mass spectrometer generates a better resolution (the better mass resolution leads to good separation of the signals of possible adducts). In addition, well-characterized standard proteins, which can be used as calibrants, are available for this mass range. The matrix DHAP is also ideal for the analysis of glycoproteins, in particular.

To produce the matrix solution, 7.6 milligrams of 2,5-DHAP are dissolved in 375 microliters of ethanol; 125 microliters of an aqueous solution of diammonium citrate (DHC, diammonium hydrogen citrate, $C_6H_8O_7*2NH_3$) at a concentration of 18 milligrams per milliliter is then added. The sample, which is a crude digest (IdeS enzyme) in the case of antibodies, is diluted in large excess with a solution of 1%) trifluoroacetic acid (TFA) in water (for example 5 microliters of digest solution with 115 microliters of TFA). 12.5 microliters of the matrix solution are added to 25 microliters of this diluted digest solution.

It is, unfortunately, difficult to crystallize this matrix substance uniformly on the sample support. As the sample solutions dry, the matrix material is often deposited as an irregular crust at the edge of the sample droplets, which means that the laser shots for the desorption cannot achieve good ionization.

A long-known solution to this problem consists in preparing the mixture of sample solution and matrix solution in a microvessel (for example an Eppendorf reaction vessel) and rapidly drawing it in and out with a pipette for several minutes until the solution becomes turbid because of a large number of crystal nuclei. Another method proposes that the crystallization in the solution be initiated by scraping the pipette tip against the wall of the vessel. Crystallization starts after around three to five seconds. It is advantageous here if the solvent, such as ethanol, evaporates in order to increase the concentration of the matrix material. A pipette can then be used to apply approximately one to two microliters of the turbid solution to a sample support, for example at an anchor spot of an anchor plate (Bruker Daltonik GmbH "MTP AnchorChip Targets"). Drying the sample solution with matrix material produces a relatively uniform, thin crystal layer that is ideal for a matrix-assisted ionization (e.g. MALDI) and provides mass spectra with a very high mass resolution.

This method is, unfortunately, labor-intensive and time-consuming, requires a certain amount of skill, and cannot be automated. Pipetting robots cannot pipette fast enough to cause the solution to become turbid. Neither are they able to scrape their pipette tips specifically against the walls of the vessel. Even an experienced specialist requires a certain amount of practice to estimate the degree of turbidity correctly and then apply the solution onto the sample support. The preparation difficulties mean that the matrix material DHAP is rarely used despite its excellent properties.

Similar problems can occur with other matrix substances also.

In view of the foregoing, there is therefore a need to provide an automatable method for the (parallel) preparation of (large numbers of) samples for matrix-assisted ionization (e.g. MALDI), particularly with DHAP as the matrix material.

SUMMARY OF THE INVENTION

The invention provides a method of preparing samples for mass spectrometric analysis with matrix-assisted ionization, using matrix material that can be dissolved in organic solvents. The method is characterized by the combining of a plurality of small solid bodies with a solution containing matrix material in microvessels. The solution with the bodies is shaken or otherwise agitated for a predetermined length of time, and a suitable quantity of the shaken or agitated solution is transferred onto a mass spectrometric sample support, where it is prepared for the ionization.

The invention can be used for a variety of purposes. It allows better and faster homogenization of matrix solutions, for example. It is even possible for liquids that are not soluble in each other to be homogenized into a "milk". Or matrix material can already start to crystallize out in the liquid.

The solid bodies can be made from glass, ceramic, metal, or plastic, and can be spherical or cylindrical in shape, for example. They preferably have diameters of around 0.3 to 2 millimeters. The microvessels can be located in microtitration plates (MTP) or be designed as separate vessels in the nature of Eppendorf tubes. Approximately 5 to 15 solid bodies are preferably placed into each microvessel.

The invention has particular advantages when 2,5-dihydroxyacetophenone (DHAP) or 2,4,6-trihydroxyacetophenone-monohydrate (THAP) is used as the matrix material. 2,5-dihydroxyacetophenone (DHAP) can be dissolved in ethanol, and a suitable quantity of an aqueous solution of diammonium citrate (DAC) can be added. In this case, the invention offers the possibility for crystallization to be initiated in the liquid, which causes the liquid to turn slightly turbid, and the preparations on the sample support plates generate crystal layers that are particularly suitable for matrix-assisted ionization (e.g. MALDI).

The solution of samples and matrix materials can be shaken or agitated with the bodies either for a specific length of time or until the liquid becomes turbid, which is easy to verify visually and also optically when the process is automated.

Preparation of the liquid for ionization on mass spectrometric sample supports can, particularly, be carried out on plates with hydrophilic anchors surrounded by a hydrophobic region (anchor plates). The anchor diameters can be 0.4 to 2 millimeters, preferably 0.8 millimeters.

Ethanol, isopropanol or acetonitrile can be used as the organic solvent for dissolving the matrix materials.

The invention is also suitable for commercially supplying microtitration plates equipped with microvessels which contain suitable quantities of solid bodies and have a removable seal. A good way of sealing the unit is to use an adhesive film, which ensures that the solid bodies, which are counted out for each vessel, do not fall out of the vessel even when the packaged plate is being transported. By way of example, the U.S. Pat. No. 7,318,590 B2 is referred to, in which such a sealing film is described.

Glass beads are particularly advantageous as solid bodies because they quickly settle in the liquid after shaking and are not transferred onto the sample support by the pipette. Beads made of plastic have a tendency to float. Steel beads in the matrix solution have a certain tendency to rust and therefore do not look very good after use.

Preparation can be advantageously carried out with a pipetting and shaking robot, for the example the "Bravo®" robot manufactured by Agilent Technologies, Inc. This device can carry out parallel preparation in microtitration plates for a large number of samples, and its 96 pipettes can easily transfer the supernatant liquid simultaneously onto a sample support with a corresponding number of preparation sites.

The invention particularly facilitates the use of DHAP as the matrix material, which has never been widely used, despite its ideal ionization properties, because sample preparation is difficult. With DHAP, the invention can bring about an initial crystallization (i.e. the formation of tiny crystal nuclei) in the liquid, causing the liquid to become turbid. The degree of turbidity, or a change in turbidity, can easily be detected visually and also optically when the process is automated. Around 5 to 15 solid bodies in each microvessel are sufficient to initiate crystallization in one to two minutes by shaking or another form of agitation. The transfer of the turbid liquid to a mass spectrometric sample support produces a very uniform, thin crystal layer as the liquid dries, which is ideal for a matrix-assisted ionization (e.g. by laser bombardment).

For ease of handling, microtitration plates can be equipped with solid bodies in the factory and sold on a commercial basis. These pre-equipped microtitration plates can particularly be sold together with ready-made matrix solution (2,5-dihydroxyacetophenone and diammonium citrate in ethanol) as a kit-of-parts. The matrix solution can be pre-filled into the microtitration plates, particularly together with the suspended solid bodies, or can be supplied separately in small bottles.

BRIEF DESCRIPTION OF THE DRAWINGS

The invention can be better understood by referring to the following illustration. The elements in the illustration are not necessarily to scale, but are primarily intended to illustrate the principles of the invention (mostly schematically).

DETAILED DESCRIPTION

While the invention has been illustrated and explained with reference to a number of embodiments, those skilled in the art will recognize that various changes in form and detail can be made without departing from the scope of the technical teaching, as defined in the enclosed claims.

The invention can be used for a variety of purposes. It enables better and faster homogenization of the matrix solution, for example. It is even possible for liquids that are not soluble in each other to be homogenized into a "milk". And it is also possible to initiate crystallization of matrix material in the liquid.

The description focuses primarily on the initiation of crystallization of the dissolved matrix material DHAP (2,5-dihydroxyacetophenone), without this procedure restricting the invention to this specific case, however. The matrix material is particularly intended to be used for analyses of immunoglobulin antibodies (IgG antibodies).

The antibodies, which are dissolved in a buffer, are digested with the IdeS enzyme at 37° C. in around 30 minutes to form large subunits (crude digest) in a workflow which is marketed by the Swedish company Genovis AB under the name FabRICATOR®.

To produce the matrix solution, 7.6 milligrams of 2,5-DHAP are dissolved in 375 microliters of ethanol; then 125 microliters of an aqueous solution of diammonium citrate (DHC, diammonium hydrogen citrate, $C_6H_8O_7*2NH_3$) at a concentration of 18 milligrams per milliliter are added. The sample, which in this example takes the form of a solution of the subunits of the antibodies in a buffer, is diluted with a solution of 1% trifluoroacetic acid (TFA) in water in large excess (for example 5 microliters of digest solution with 115 microliters of TFA). 12.5 microliters of the matrix solution are added to 25 microliters of this diluted digest solution. Other sample compositions can, of course, also be subjected to the method presented here.

Figure 1A:
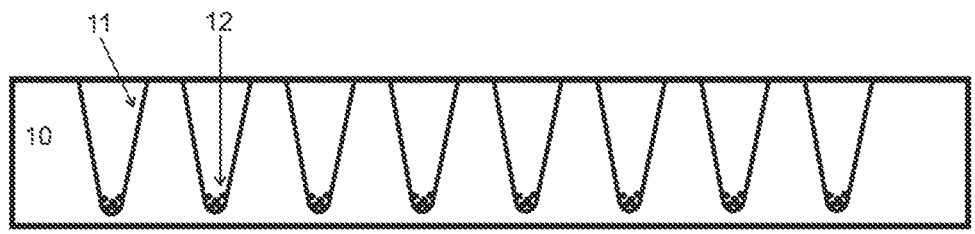
FIG. 1A shows a cross-section through a microtitration plate (10) with approximately conical microvessels (11), which are charged with solid bodies in the form of beads (12).
Figure 1B:
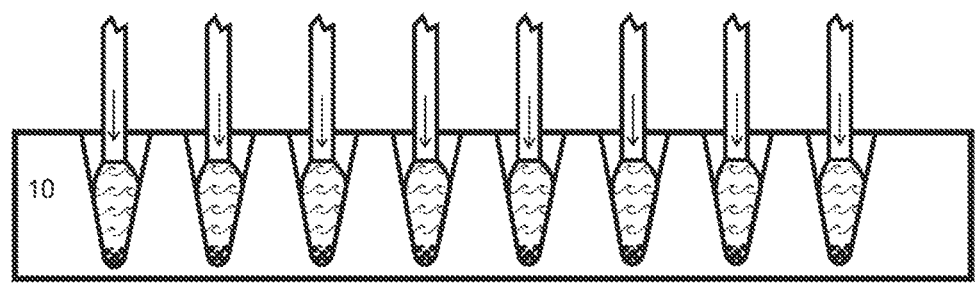
FIG. 1B shows the microtiter plate of FIG. 1A with a matrix solution and sample solution being added to the microvessels.
Figure 1C:
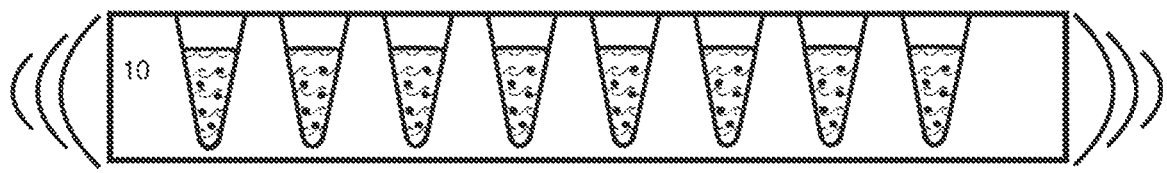
FIG. 1C shows the microtiter plate of FIGS. 1A and 1B being shaken to initiate crystallization of the matrix material therein.
Figure 1D:
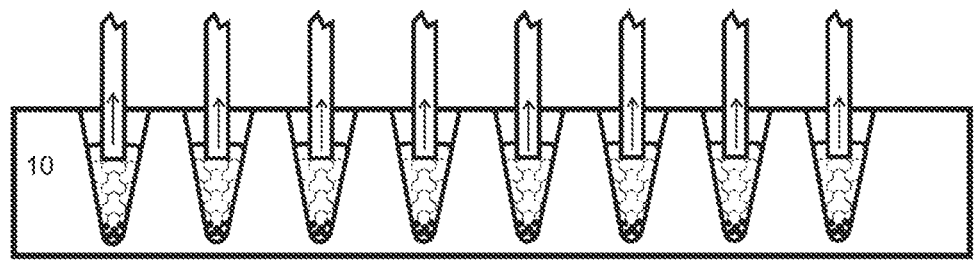
FIG. 1D shows the removal of liquid containing the crystals from the microvessels of the microtiter plate of FIGS. 1A-1C.
Figure 1E:
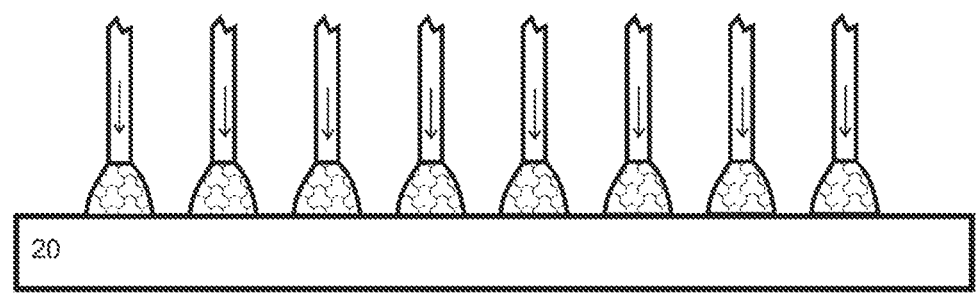
FIG. 1E shows the pipetting of the crystal-containing liquid of FIG. 1D onto a sample support plate (20).

FIGS. 1A to 1F depict a possible method, simplified in cross-section. A simple, but very effective embodiment of the invention consists in carrying out the sample preparation in the 96 microvessels (11) of microtitration plates (10), adding several solid bodies (12), e.g. in the form of glass beads (FIG. 1A), adding around 15 microliters of matrix solution and 30 microliters of sample solution (for example the diluted digest solution) to each microvessel (FIG. 1B), and initiating crystallization of the matrix material by shaking ("vortexing") it on a shaker (not shown) (FIG. 1C). It is preferable that the microvessels remain open during the shaking so that the solvent, such as ethanol, can evaporate from the liquid in order to increase the concentration of matrix material. The filling level in the vessels must then be chosen accordingly. It is sufficient to have approximately 5 to 15 glass beads, 0.5 millimeters in diameter, in each microvessel, for example. The solid bodies can easily be added using the tip of a small spatula. The crystallization causes the liquid to become slightly turbid within one to two minutes. The turbidity is caused by a large number of tiny crystal nuclei, and is easy to detect visually and also optically when the process is automated.

Chemical laboratories have long been aware that crystallization can be initiated in a supersaturated solution by friction between solids, usually by scraping a laboratory instrument against the wall of the vessel, although the precise mechanism whereby the friction brings about the nucleation is unknown. The initiation of crystallization of a matrix substance by solid bodies on a vortexer or by continuous pipetting has not yet been elucidated, however.

Glass beads for the preparation of MALDI samples have so far only been used for dry, solvent-free preparation of insoluble polymers (S. Trimpin et al., J. Am. Soc. Mass Spectrom. 2007, 18, 377-381).

Figure 1F:
FIG. 1F shows solid crystals formed on the sample support plate (20) following the pipetting of the liquid shown in FIG. 1E.

In contrast to this solvent-free approach, the turbidity is created by a large number of tiny crystals which are suspended in the liquid. The tiny crystals grow slowly as the solvent, such as ethanol, evaporates; the liquid is stable for several minutes, however, and can be easily removed from the microvessels (FIG. 1D), pipetted onto a sample support plate (20) (FIG. 1E), where they crystallize out (FIG. 1F).

It is advantageous to use a commercially available "vortexer" (not shown) to perform the shaking. The duration and frequency can be preset. The turbid liquids can be pipetted manually, transferring around one to five microliters at a time onto the sample support plate of a mass spectrometer. The tip of the pipette must be changed after each transfer. A more elegant solution, however, is to use the vortexer of a pipetting robot and to transfer the liquid to the sample support (20) using the 96 pipettes of the robot (FIGS. 1A to 1F). This is only made possible by the method presented here.

Any sample supports may be used. The only criterion is that they must be suitable for the mass spectrometer. Steel plates, glass plates coated with indium tin oxide (ITO) or appropriate ceramic plates, for example, are suitable for this purpose. Any type of mass spectrometer may be used; it is preferable for it to be equipped with a MALDI ion source and a suitable pulsed UV laser. Special MALDI time-of-flight mass spectrometers are ideal.

Particularly suitable as sample supports are so-called "anchor plates" (Bruker "MTP AnchorChip Targets"), which have a pattern of circular hydrophilic spots ("anchors") surrounded by a hydrophobic region on their surface. The hydrophobic region restricts the spread of drops beyond the edge. Anchor plates the same size as microtitration plates are available with 384 or 1536 anchors, ideal for pipetting robots with 96 pipettes. The anchors usually have a diameter of 0.8 millimeters. If, for example, one microliter of the turbid sample solution is transferred to an anchor, a very thin, very uniform layer of small matrix crystals is formed as the solution dries, and the sample molecules are embedded therein.

It can be particularly advantageous to carry out the preparation using a pipetting and shaking robot, for example the "Bravo Automated Liquid Handling Platform" manufactured by Agilent Technologies, Inc. This robot can shake the microtitration plates with adjustable frequency and duration on a vortexer station, and also easily transfer the supernatant liquid with its 96 pipettes onto a sample support. Changing the pipette tips is also automated. The preparation of many samples in parallel is thus fulfilled for the purpose of the invention.

The solid bodies (beads) can be made of plastic, metal, or preferably glass, with diameters between 0.3 and 2 millimeters. The exact material seems to be unimportant for the initiation of crystallization. Round glass beads are particularly advantageous because they can be purchased at low cost, they quickly settle in the liquid after agitation and therefore are not transferred onto the sample support by the pipette when the liquid offers sufficient supernatant. Around 5 to 15 glass beads with a diameter of approximately 0.5 millimeters is sufficient to initiate crystallization in one to two minutes. Plastic beads have a tendency to float, steel beads in the matrix solution have a tendency to rust and therefore do not look very good after use.

To facilitate the analytical process, solid bodies can be added to the plastic microtitration plates in the factory. Special lids which prevent the solid bodies from falling out are available for the microtitration plates. The microtitration plates prepared in this way can, particularly, be sold together with an industrially produced ready-made matrix solution (2,5-dihydroxyacetophenone and diammonium citrate in ethanol) as a kit-of-parts. The matrix solution can be prefilled into the microtitration plates, or can be supplied separately in small bottles.

All types of mass spectrometer that are equipped with an ion source for matrix-assisted ionization and deliver mass spectra in the desired mass range can be used for the analysis. MALDI time-of-flight mass spectrometers, in particular, are used. They have axial injection of the ions into the flight path and utilize the pulsed ionization produced by UV laser bombardment. They can be used either in linear mode or with a reflector; the linear mode is often preferred for analyses with DHAP-MALDI.

The method of transferring a matrix solution made turbid by crystal nuclei onto a mass spectrometric sample support produces a very uniform, thin layer of matrix crystals, ideal for matrix-assisted ionization (e.g. MALDI). The thin layer means an outstandingly high mass resolution is achieved.

Further embodiments of the invention are conceivable in addition to the embodiments described by way of example. With knowledge of this disclosure, the person skilled in the art is easily able to design further, advantageous sample preparation methods for mass spectrometric measurement using matrix-assisted ionization, which are to be covered by the scope of protection of the claims, including any possible equivalents.

The invention claimed is:

1. A method of preparing samples for mass spectrometric analyses with matrix-assisted ionization using matrix material which can be dissolved in organic solvents, the method comprising:
   combining a plurality of solid bodies with a solution containing matrix material in microvessels,
   shaking or otherwise agitating the solution with the solid bodies for a predetermined length of time, and
   transferring a suitable quantity of the shaken or agitated solution onto a mass spectrometric sample support, where it is prepared for the ionization.

2. The method according to claim 1, wherein the solid bodies are made of glass, ceramic, metal, or plastic.

3. The method according to claim 1, wherein the solid bodies are spherical or cylindrical in shape.

4. The method according to claim 1, wherein the solid bodies have diameters of around 0.3 to 2 millimeters.

5. The method according to claim 1, wherein around 5 to 15 solid bodies are added to each microvessel.

6. The method according to claim 1, wherein 2,5-dihydroxyacetophenone (DHAP) or 2,4,6-trihydroxyacetophenone monohydrate (THAP) is used as the matrix material.

7. The method according to claim 6, wherein the 2,5-dihydroxyacetophenone (DHAP) is dissolved in ethanol and a suitable quantity is added to an aqueous solution of diammonium citrate (DAC).

8. The method according to claim 1, wherein the solution with the bodies is shaken or agitated until the liquid becomes turbid.

9. The method according to claim 1, wherein the microvessels are in microtitration plates or in separate vessels in the nature of Eppendorf tubes.

10. The method according to claim 1, wherein plates with hydrophilic anchors surrounded by a hydrophobic region (anchor plates) are used as mass spectrometric sample supports.

11. The method according to claim 10, wherein anchor plates with anchor diameters of 0.4 to 2 millimeters are used.

12. The method according to claim 11, wherein anchor plates with anchor diameters of approximately 0.8 millimeters are used.

13. The method according to claim 1, wherein ethanol, isopropanol or acetonitrile is used as the organic solvent.

* * * * *